US011061154B2

(12) United States Patent
Risser et al.

(10) Patent No.: US 11,061,154 B2
(45) Date of Patent: Jul. 13, 2021

(54) ACOUSTIC PROPPANT FOR FRACTURE DIAGNOSTIC

(71) Applicant: Battelle Memorial Institute, Columbus, OH (US)

(72) Inventors: Steven Risser, Reynoldsburg, OH (US); Slawomir Winecki, Dublin, OH (US); Ramanathan Lalgudi, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 424 days.

(21) Appl. No.: 16/006,194

(22) Filed: Jun. 12, 2018

(65) Prior Publication Data

US 2019/0062623 A1 Feb. 28, 2019

Related U.S. Application Data

(60) Provisional application No. 62/518,572, filed on Jun. 12, 2017.

(51) Int. Cl.
| | |
|---|---|
| *G01V 1/02* | (2006.01) |
| *C09K 8/92* | (2006.01) |
| *C09K 8/88* | (2006.01) |
| *C09K 8/80* | (2006.01) |
| *C09K 8/84* | (2006.01) |
| *E21B 43/263* | (2006.01) |
| *G01V 1/04* | (2006.01) |
| *E21B 43/267* | (2006.01) |
| *E21B 49/00* | (2006.01) |
| *G01V 1/108* | (2006.01) |

(52) U.S. Cl.
CPC ............ *G01V 1/02* (2013.01); *C09K 8/805* (2013.01); *C09K 8/845* (2013.01); *C09K 8/88* (2013.01); *C09K 8/92* (2013.01); *E21B 43/263* (2013.01); *G01V 1/04* (2013.01); *E21B 43/267* (2013.01); *E21B 49/00* (2013.01); *G01V 1/108* (2013.01)

(58) Field of Classification Search
CPC . C09K 8/92; C09K 8/88; C09K 8/805; C09K 8/845; G01V 1/02; G01V 1/04; E21B 43/263; E21B 43/267
See application file for complete search history.

(56) References Cited

U.S. PATENT DOCUMENTS

| | | | |
|---|---|---|---|
| 7,134,492 B2 | 11/2006 | Willberg et al. | |
| 8,168,570 B2 * | 5/2012 | Barron | C09K 8/805 |
| | | | 507/269 |
| 9,562,426 B2 * | 2/2017 | Roberts | E21B 43/267 |

(Continued)

OTHER PUBLICATIONS

Basu, Saptaswa, "Fracture Diagnostics using Low Frequency Electromagnetic Induction", MS Thesis, Graduate School or the University of Texas at Austin, Austin, Texas, 2014.

(Continued)

*Primary Examiner* — Ian J Lobo
(74) *Attorney, Agent, or Firm* — Susanne A. Wilson; Frank Rosenberg

(57) ABSTRACT

Methods of mapping a subterranean formation using imploding particles are described. In some cases, the particles contain a material that generated a gas which passes through a water-insoluble coating to create a void within the particle. In some aspects, the implosive particles have a coating that dissolves in the subterranean formation.

10 Claims, 4 Drawing Sheets

(56) References Cited

U.S. PATENT DOCUMENTS

| | | | |
|---|---|---|---|
| 10,087,365 B2 * | 10/2018 | Bestaoui-Spurr | B05D 3/0218 |
| 10,196,894 B2 * | 2/2019 | Andrzejak | F42B 3/117 |
| 10,378,345 B2 * | 8/2019 | Hall | E21B 43/263 |
| 2013/0068469 A1 * | 3/2013 | Lin | E21B 43/267 |
| | | | 166/369 |
| 2016/0146963 A1 | 5/2016 | Hall et al. | |

OTHER PUBLICATIONS

Deirram et al., "Hydrolysis Degradation of Polycarbonate Using Different Co-solvent Under Microwave Irradiation," APCBEE Procedia 3 (2012) 172-176.

Ramsey, M.G., "Energetic Cavitation Collapse", Ph.D. Thesis, Mechanical Engineering Department of Vanderbilt University, Nashville, TN, 2013.

Youn D.H, et al. The Direct Contact Condensation of Steam in a Poll at Low Mass Flux, Journal of Nuclear Science and Technology, vol. 40, No. 10, p. 881-885 (2003)).

\* cited by examiner

ACOUSTIC PROPPANT FOR FRACTURE DIAGNOSTIC

RELATED APPLICATION

This application claims the priority benefit of U.S. Provisional Patent Application Ser. No. 62/518,572, filed 12 Jun. 2017.

FIELD OF THE INVENTION

The invention concerns materials and methods for generating acoustic signals for mapping hydraulic fracturing.

INTRODUCTION

Subterranean fluids, such as oil, gas and water, can be removed by a technique known as hydraulic fracturing. In this technique, a fluid is injected under pressure which causes the formation or enlargement of fractures in a subterranean formation. Proppant particles are used to hold open the fractures that result from the pressurized injection.

Methods for mapping subterranean formations have been described. Two such methods are described in U.S. Pat. No. 7,134,492 and US Patent Publication No. 2016/0146963, both of which are incorporated herein as if reproduced in full below. In U.S. Pat. No. 7,134,492, Willberg et al. discuss pumping small explosive or implosive sources into a fracture. This could be done by injecting a slurry of implosive hollow glass spheres with the acoustic signals received by a detector placed in the wellbore. In US 2016/0146963, Hall et al. describe a method of mapping a subterranean formation using coated reactive particles having a coating over a reactive core. The payload of the core reacts with one or more catalyst particles to produce a micro-seismic event that is stated to be a detonation, explosion, implosion, or chemical reaction.

Despite these disclosures and other work, there remains a need to improve the mapping of subterranean formations. Explosive methods are undesirable because the transport of explosives and pumping of these explosives can be dangerous or subject to accidents. Furthermore, there is a need for methods that provide greater control over the timing and duration in the generation of acoustic signals in a subterranean formation.

SUMMARY OF THE INVENTION

In one aspect, the invention provides a method of mapping a volume using acoustic signals, comprising: injecting gas-generating, collapsible particles into a volume comprising a liquid comprising water; wherein the gas-generating, collapsible particles comprise a water-insoluble coating and a gas-generating core; wherein the water-insoluble coating does not dissolve but allows a reactant to pass from outside the particle through to the gas-generating core, and allows a generated gas to pass from the core to outside the particle; wherein the reactant passes through the water-insoluble coating and reacts with the gas-generating core to generate gas; wherein the generated gas passes through the water-insoluble coating to create a void within the particle; wherein pressure from the liquid in the volume crushes the water-insoluble coating and produces sound waves in the liquid; and detecting the sound waves with an acoustic detector that is in sonic contact with the liquid.

Preferably, the reactant is water or an aqueous solution. The step of injecting can be any method of introducing the gas-generating, collapsible particles into the volume, preferably, pumping a slurry comprising the particles into the volume. The particles are preferably added along with proppants (typically in a slurry) and the step of injecting may coincide with a step of creating fractures within the subterranean formation. The volume refers to a space through which a fluid can flow. Preferably, this space is a subterranean formation that contains a wellbore and, often, a hydrocarbon. The liquid contains water, typically at least 90 mass % water, and may contain a component such as an acid (in some embodiments, HCl or $H_2SO_4$) that causes the gas-generating reaction. The water-insoluble coating is preferably a polymer such as, but not limited to, polypropylene (PP), polyethylene (PE, low or high density), nylon, polyetherimide (PEI), polyvinylchloride (PVC), sulfonated polyeteretherketon (SPEEK), polydimethylsiloxane (PDMS) ethyl cellulose (EC), sulfonated polyethersulfon (SPES), cellulose acetate (CA), polyphenylene oxide (PPO), polyethersulfone (PES), polycarbonate (PC), polysulfone and combinations thereof, or an inorganic material such as a porous glass. The gas-generating core comprises a carbonate such as an aryl carbonate, calcium carbonate, magnesium carbonate, lithium carbonate, potassium carbonate, sodium carbonate, ammonium carbonate, bicarbonates such as sodium or potassium bicarbonate. In some embodiments, sodium, potassium, or lithium chlorates or perchlorates can be used; however, these are not preferred due to toxicity. In this aspect, the coating allows water to pass—the water (typically acidic water) passes through the coating to the gas-generating core.

The methods of the invention use signals from the acoustic detector to the map the volume. There are known methods of converting the signals to maps of the volume, and there is no need to describe these conventional methods here.

In another aspect, the invention provides a method of mapping a subterranean formation, comprising: injecting the particles through a wellbore into a subterranean formation; allowing the particles to implode to create acoustic signals; and detecting the acoustic signals; wherein the particles that are injected are hollow glass spheres that are coated with a coating that dissolves in water. In some preferred embodiments, the coating comprises cellulose acetate, polyvinylalcohol, carboxymethyl cellulose, hydroxypropyl methylcellulose, or a water soluble epoxy resin. In some embodiments, the particles that are injected comprise a mixture of different coating thicknesses to create acoustic signals distributed over time. In some embodiments, the coated particles are designed to implode at different times—this provides information about the injection as a function of time. For example, the particles have at least a bimodal distribution of coating thicknesses with at least 20% of the particles (by volume as measured prior to injecting) having a thickness that is at least 25% (or at least 50%) different than the average thickness of at least 20% of other particles (by volume as measured prior to injecting) in a particle mixture.

In other aspects, the invention includes compositions comprising the particles described herein; and in some embodiments mixtures of these particles with proppant particles and/or subterranean formations comprising these particles.

The invention may be useful in a number of ways, and in preferred examples, in understanding the extent of a hydraulic fracture; optimizing recovery of fluids, and planning for possible future fracturing operations.

Glossary

Acoustic sensors are well known and are commercially available. In the inventive methods, the sensor(s) may be placed on the surface, more preferably in a wellbore or in wells drilled for monitoring the fracture site.

During the hydraulic fracturing process, a pressurizing fluid typically contains proppant as a slurry or gel. The acoustic mapping methods of the present invention are generally applicable and are not limited to particular well types with vertical wells being most common. The acoustic particles can be pumped in with the pressurizing fluid, or subsequent to formation/enlargement of the fracture. Similarly, a reactive fluid (if used in the method), such as an acid, may be added with the pressuring fluid, or subsequent to formation/enlargement of the fracture, and may be added along with, or separate from, the acoustic particles.

A "proppant" refers to a particle such as sand or a man-made particle that is sufficiently insoluble under conditions underground to resist disintegration. Because the proppants can be used to form a porous network around a wellbore; and are not necessarily required to prop open fractures in an underground formation, they need not have the hardness required of conventional proppants. Essentially, the proppants of the present invention can be any particle that can carry a resin coating and resist disintegration under conditions present in the vicinity of a water injection or production wellbore.

Sonic contact—means that the acoustic detector must be in contact with the liquid such that sound waves from the particle implosions would be transmitted to the detector. The methods of the invention can operate with a conventional acoustic detector and known processes for using the information from the acoustic detector to the map the volume.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but rather, listing exemplary components.

If there is any conflict in the usages of a word or term in this specification and one or more patent or other documents mentioned herein, the definitions that are consistent with this specification should be adopted for the purposes of understanding this invention.

DESCRIPTION OF THE INVENTION

In one of the methods, hollow microspheres having similar size and handling properties of a conventional proppant are pumped downhole mixed into the proppant.

Figure 1:
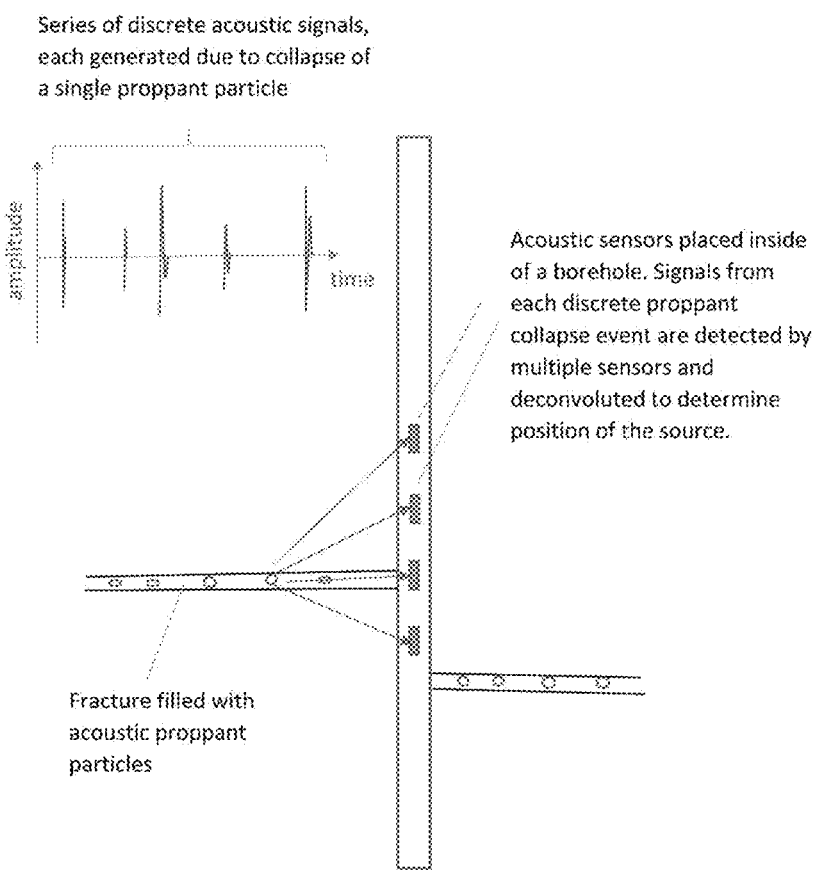
FIG. 1: Geometry of a fracture diagnostic method using acoustic proppant.
Figure 2:
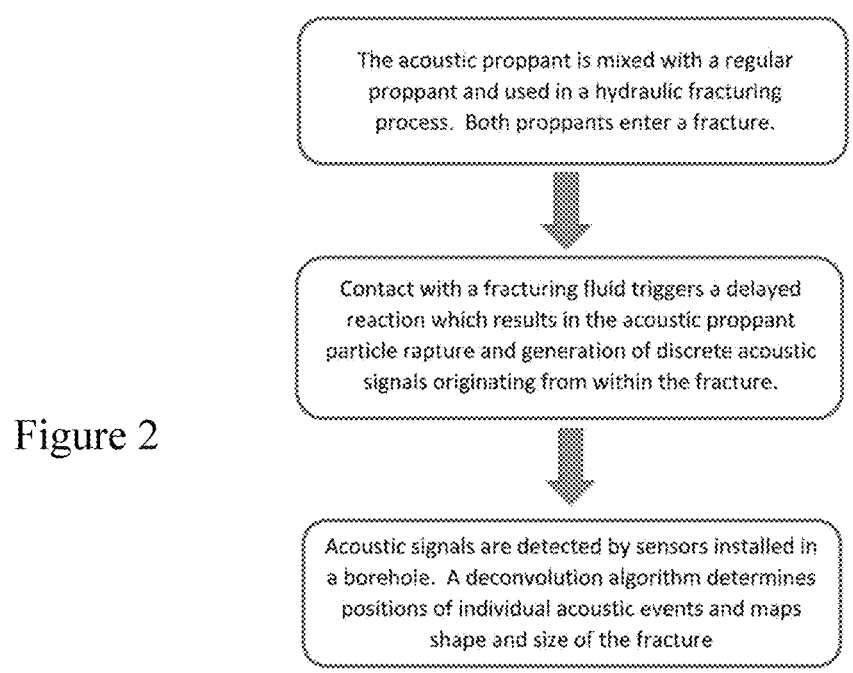
FIG. 2: Sequence of events in the proposed fracture diagnostic method.

The geometry of one fracture diagnostic system is shown schematically in FIG. 1. An acoustic proppant, which upon exposure to fracturing fluid, undergoes chemical and physical transformations leading to its abrupt rupture and emission of an acoustic signal. The rupture takes place after a time delay, on the order of several hours. This is a key feature, as the delay allows the fracturing processes to stop or be suspended before there is the generation of the acoustic signal. If the delay time of the delayed response is slightly variable, the analysis of the signal will be easier, as there will now be multiple acoustic events that are clearly separated in time. These acoustic signals are detected by an array of sensors installed in the borehole near the fracture. Signal strength and time information collected for each discrete rupture event is used to pinpoint the location of a proppant particle which generated it. Position information from all proppant particles filling a fracture provides a full map of the fracture shape and size. FIG. 2 summarizes the sequence of events involved in the fracture diagnostic process.

An important aspect of the proposed fracture diagnostic method is the use of discrete signals generated by individual proppant particles. As it was demonstrated by the proof-of-concept hollow glass microspheres crushing experiments discussed below, the acoustic signals generated by individual particles are distinct and quite short, therefore can be relatively easily separated from each other. This separation greatly simplifies the deconvolution process since it can be assumed that each acoustic signal originates from one small volume within a fracture. In contrast, the diagnostic methods that are based on signals generated by the entire fracture volume require a much more challenging deconvolution algorithm [Sharma, M., 2016, "Fracture Diagnostics Using Low Frequency EM Induction and Electrically Conductive Proppant"].

Figure 3:
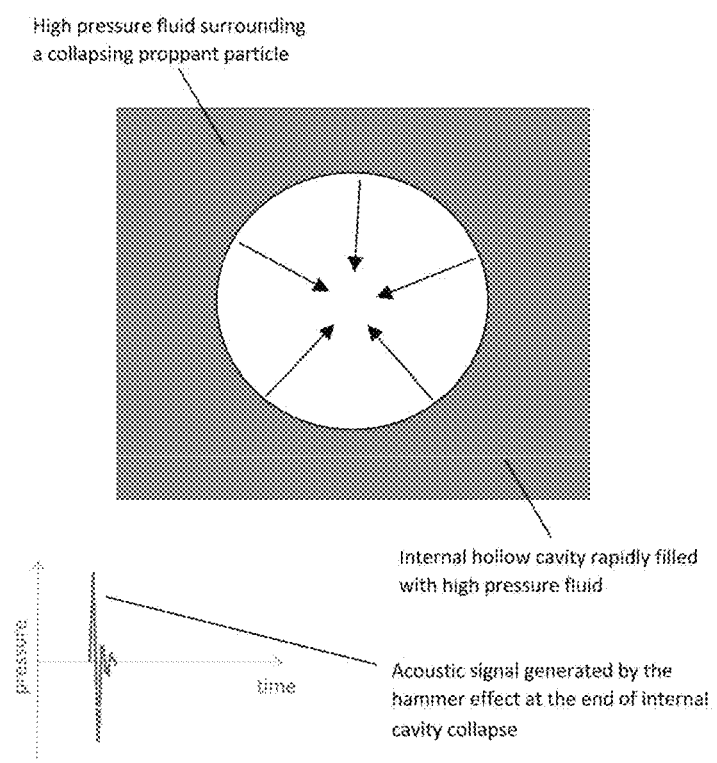
FIG. 3: Schematic diagram of collapsing gas-filled bubble geometry.

One of the critical factors needed for successful implementation of the proposed fracture diagnostic method is sufficient strength of the acoustic signals generated during rupture of proppant particles. To maximize the acoustic signal strength, the proposed proppant design will be based on collapse of gas-filled bubbles immersed in liquids. It is known that collapse of hollow or gas-filled bubbles in liquids like water results in a water hammer effect and generation of strong pressure shock waves. This effect is very pronounced in systems where steam is injected into cold liquid water and the water hammer pressure fluctuations cause strong vibrations [Youn, D. H et al., "The direct Contact Condensation of Steam in a Pool at Low Mas Flux" Journal of Nuclear Science and Technology, vol 10, No 10, p. 881-885, (20030]. Mathematical models describing the steam bubble condensation dynamics are available in published literature [Ramsey, M. C., "Energetic Cavitation Collapse", Ph.D. Thesis, Mechanical Engineering Department of Vanderbilt University, Nashville, Tenn., 2013]. FIG. 3 schematically illustrates a collapsing gas-filled bubble geometry that can be used in the acoustic proppant method that is described here.

Two approaches to make suitable, implodable particles are: modifying commercially available hollow glass microspheres; or creating a core/shell particle with a core that reacts with water that diffuses through the shell, to create the hollow particle. We will describe each of these in detail.

Approach 1: There are commercially available hollow glass microspheres available, with a wide range of burst pressures for the microspheres. These particles cannot be directly used in this application, as the particles will either burst while being transported downhole, or as soon as they reach the bottom of the bore hole, or else they will not burst.

Although additional hydrostatic pressure could be added to cause the glass microspheres to rupture, they would all rupture at the same time, causing the analysis challenge associated with the existing explosive technology.

However, the hollow glass microspheres can be modified by coating the microspheres with a polymer material that will degrade during exposure to the aqueous downhole environment. The encapsulation of the glass microsphere will act to strengthen the walls of the sphere, increasing its burst pressure. As the polymer coating degrades, the burst pressure of the microsphere will decrease, until it reaches the pressure in the fracture. At this time, the microsphere will burst, releasing the acoustic signal. Because the time required to reach the burst point will be slightly different for each microsphere, a series of individual acoustic events will be generated, simplifying the data processing. It is desirable to use glass microspheres with burst pressure that is slightly less than that present in the fracture. If the difference is too large, a very thick encapsulating shell will be required, increasing cost, and also increasing the length of time between pumping the particles downhole and the creation of the acoustic events.

Approach 2: The core of the particles is a material, such as a carbonate, that will react with water to generate gas, such as $CO_2$. The carbonate could be sodium bicarbonate or other reactive carbonate. The core could be a polycarbonate. Reactions of polycarbonate to produce carbon dioxide are described in publications such as Deirram et al., "Hydrolysis Degradation of Polycarbonate Using Different Co-solvent Under Microwave Irradiation," APCBEE Procedia 3 (2012) 172-176; and Gaines, "Acceleration of hydrolysis of bisphenol-A polycarbonate by hindered amines," Polymer Degradation and Stability, vol. 27, 1990, 13-18. If desired, the water in the subterranean formation could be modified with an appropriate acid or base catalyst or co-solvent. The coating encapsulating the core will be a polymer or inorganic coating that does not degrade, but allows rapid diffusion of water and the generated gas. The concept for operation is that the particle would be pumped downhole, at which point in time water begins to diffuse into the core. The water or other suitable reactant reacts with the core material to generate the gas, while decreasing the mass of the solid core. This process continues as more water diffuses in, and the gas diffuses out of the core. The water diffusion and gas generation rates are properly matched so water does not build up in the interior. There are two possible methods to generate an acoustic signal from this particle. In the first, the gas inside the particle is created more rapidly than it can diffuse through the shell. This will increase the pressure inside the capsule, until it becomes sufficiently larger than the hydrostatic pressure such that the capsule ruptures, creating an acoustic signature. In the second method, the gas diffuses more rapidly through the shell, keeping the pressure inside the capsule close to the external hydrostatic pressure. However, as the gas generation rate drops, or the gas diffusion rate continues to increase, the pressure inside the capsule drops until the capsule implodes. The second method is preferred, as the capsule could work across a wider range of hydrostatic pressures. In the second approach, the coating is selected to allow the appropriate diffusion rate for reactant to diffuse into the core and generated gas to diffuse through the coating. A catalyst for the reaction may be added to the core to allow sufficient gas generation for either method.

EXPERIMENTS

A preliminary experiment has been conducted to demonstrate that collapsing microspheres generate a measurable acoustic signature. In this experiment, commercially available hollow glass microspheres were used, so it is not an example of the coated spheres, but does validate the underlying premise that collapsing microspheres do generate measurable acoustic energy.

The implosion tests were performed using two types of hollow glass beads specified in table 1.

TABLE 1

Types of beads (hollow glass microspheres) uses in implosion tests.

| Type of beads | Supplier | Crush strength | Diameter |
|---|---|---|---|
| Resin Filler, Glass Microspheres, #1414T36 | McMaster | ~500 psi | 40-60 μm |
| S38 | 3M | ~6,000 psi | 40-60 μm |

Figure 4:
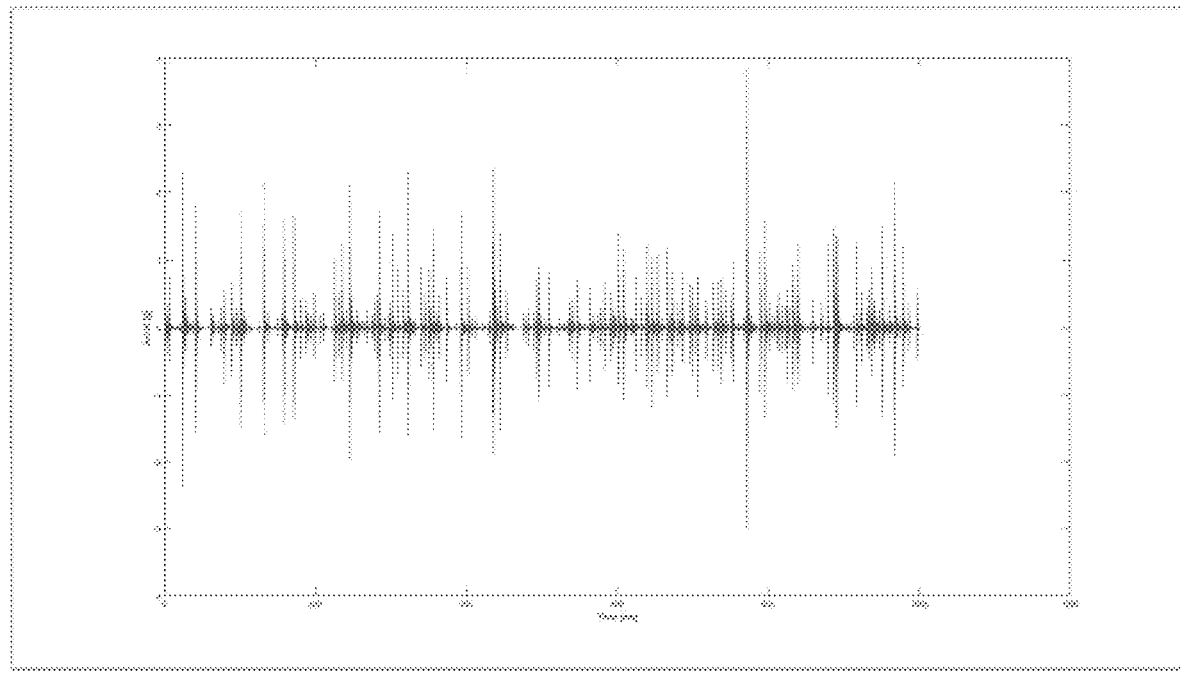
FIG. 4. Typical acoustic signal observed during the implosion tests.

The beads were placed inside of a high-pressure metal vessel filled with water. An acoustic sensor was placed outside of the vessel so there was a water layer and a steel barrier between the implosion points and the sensor. During tests, internal vessel pressure was slowly increased up to the level above the expected crush strength. The following was observed during the tests:

Strong acoustic signal was detected by the acoustic sensor. The signal had a characteristic time dependence shown in FIG. 4. The dominant features were strong and narrow amplitude spikes with ~1 ms decay time and width.

Figure 5:
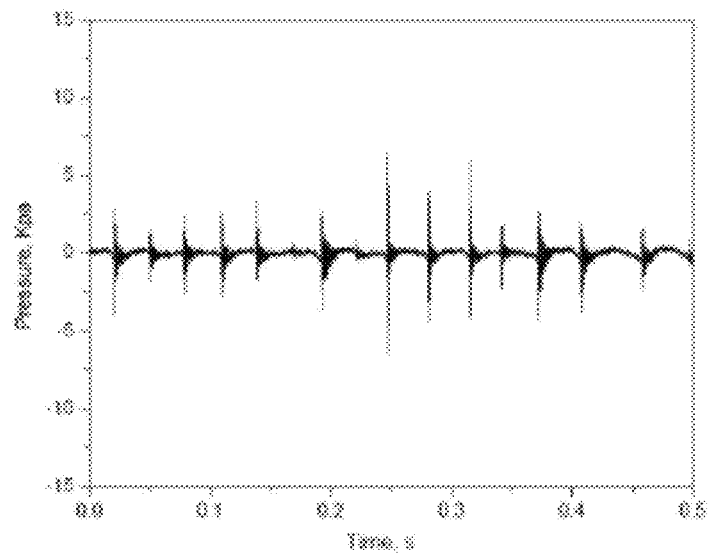
FIG. 5. Prior Art: Typical acoustic signal observed during injection of steam into water.

This form of acoustic is known for other systems that involve rapidly collapsing hollow bubbles immersed in liquid. For instance, the literature describing rapid cooling and condensation of water steam in liquid water reports very similar acoustic signals. FIG. 5 shows a typical acoustic signal detected during steam bubble condensation (figure reproduced from Youn D. H, et al. "The Direct Contact Condensation of Steam in a Poll at Low Mass Flux', Journal of Nuclear Science and Technology, vol. 40, No. 10, p. 881-885 (2003)). The strong similarity between acoustic signals shown in FIGS. 4 and 5 suggests that the same mechanism is responsible for acoustic signal generation in both situations. In the case of the steam condensation, the mechanism is a water hammer effect generated during the final stages of stem bubble collapse. Apparently, the same mechanism is active during collapse of hollow beads immersed in pressurized water.

Acoustic signal frequencies detected were in the 20-100 kHz range

The amplitude of the spikes did not change significantly between beads with 500 and 6,000 psi crush strength. Instead, the amplitude seems to have naturally wide range A control test has been performed to make sure the acoustic signal was not generated due to stresses of the pressure vessel. No acoustic signal was detected without beads inside of the vessel.

What is claimed:

1. A method of mapping a volume using acoustic signals, comprising:
    injecting gas-generating, collapsible particles into a volume comprising a liquid comprising water;
    wherein the gas-generating, collapsible particles comprise a water-insoluble coating and a gas-generating core;
    wherein the water-insoluble coating does not dissolve but allows a reactant to pass from outside the particle through to the gas-generating core, and allows a generated gas to pass from the core to outside the particle;

wherein the reactant passes through the water-insoluble coating and reacts with the gas-generating core to generate gas;

wherein the generated gas passes through the water-insoluble coating to create a void within the particle;

wherein pressure from the liquid in the volume crushes the water-insoluble coating and produces sound waves in the liquid;

detecting the sound waves with an acoustic detector that is in sonic contact with the liquid.

2. The method of claim 1 wherein the reactant is water or an aqueous solution.

3. The method of claim 1 comprising using signals from the acoustic detector to the map the volume.

4. The method of claim 1 wherein the liquid contains at least 90 mass % water.

5. The method of claim 1 wherein the water-insoluble coating is a polymer.

6. The method of claim 5 wherein the polymer is selected from the group consisting of polypropylene (PP), polyethylene (PE, low or high density), nylon, polyetherimide (PEI), polyvinylchloride (PVC), sulfonated polyeteretherketon (SPEEK), polydimethylsiloxane (PDMS) ethyl cellulose (EC), sulfonated polyethersulfon (SPES), cellulose acetate (CA), polyphenylene oxide (PPO), polyethersulfone (PES), polycarbonate (PC), polysulfone and combinations thereof.

7. The method of claim 1 wherein the water-insoluble coating is a porous glass.

8. The method of claim 1 wherein the gas-generating core comprises a carbonate.

9. The method of claim 8 wherein the carbonate is selected from the group consisting of:

calcium carbonate, magnesium carbonate, lithium carbonate, potassium carbonate, sodium carbonate, ammonium carbonate, bicarbonates and combinations thereof.

10. The method of any of claim 1 wherein the particles that are injected comprise a mixture of different coating thicknesses to create acoustic signals distributed over time.

* * * * *